Figure 1:
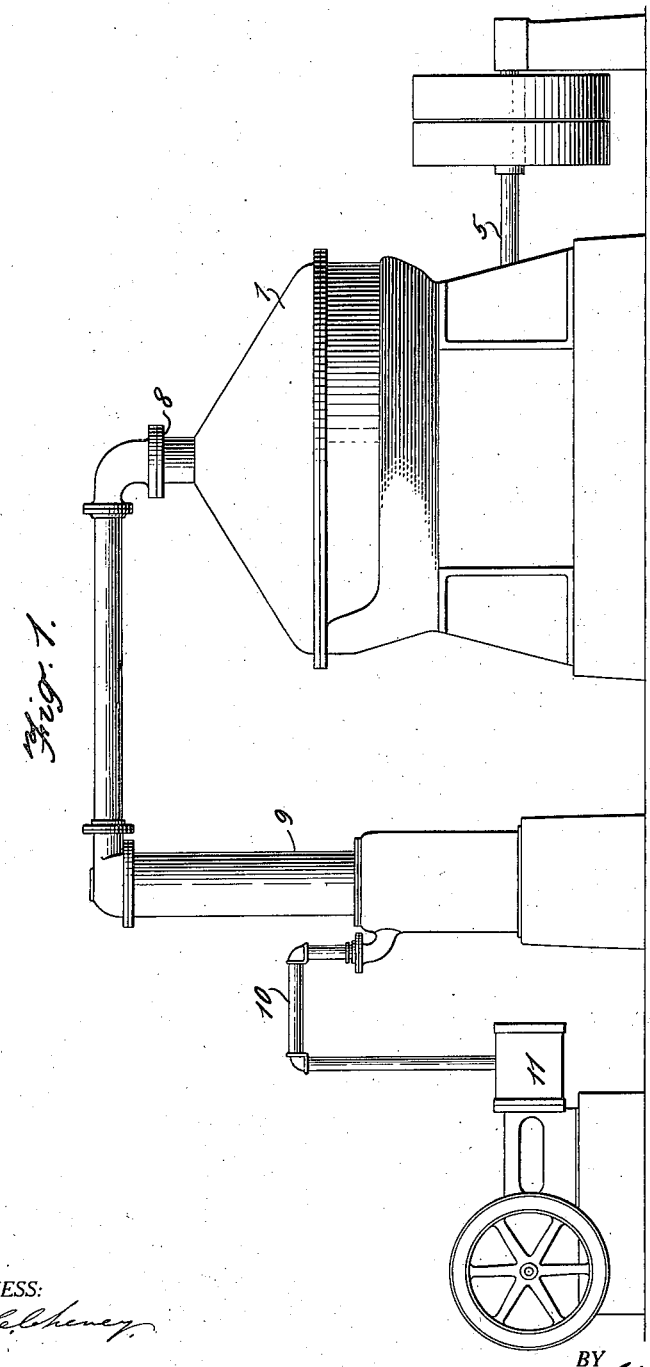

W. A. BEATTY.
TREATMENT OF RUBBER.
APPLICATION FILED JUNE 6, 1918.

1,418,271.

Patented June 6, 1922.
2 SHEETS—SHEET 1.

WITNESS:

INVENTOR.
Wallace Appleton Beatty
BY
his ATTORNEYS

W. A. BEATTY.
TREATMENT OF RUBBER.
APPLICATION FILED JUNE 6, 1918.

1,418,271.

Patented June 6, 1922.
2 SHEETS—SHEET 2.

WITNESS:

INVENTOR.
Wallace Appleton Beatty
BY
his ATTORNEYS

UNITED STATES PATENT OFFICE.

WALLACE APPLETON BEATTY, OF NEW YORK, N. Y.

TREATMENT OF RUBBER.

1,418,271.　　　　　Specification of Letters Patent.　　Patented June 6, 1922.

Application filed June 6, 1918. Serial No. 238,436.

*To all whom it may concern:*

Be it known that I, WALLACE APPLETON BEATTY, a citizen of the United States, and a resident of New York city, borough of Manhattan, in the county and State of New York, have invented certain new and useful Improvements in the Treatment of Rubber, of which the following is a specification.

My invention relates to new and useful improvements in processes for the treatment of rubber. The primary object of the invention is to provide a treatment which will efficiently and thoroughly remove from the rubber any substance or substances which tend to decomposition, or which impart to the rubber an undesirable or offensive odor or taste. The process may be found applicable for use in the treatment of rubber for use in various arts, but it is particularly applicable to treatment of rubber which is to form an ingredient of chewing gum.

It is well known that different forms of rubber or rubber-like substances are used as the base or body of chewing gum but such use has been attended with certain objections which arise chiefly from the fact that it has hitherto been found impossible to remove from the rubber certain substances which in and of themselves are objectionable, or which decompose due to oxidation or bacterial action, thereby producing decomposition products which are objectionable and cause deterioration of the rubber. My present invention contemplates a process for removing from the rubber the decomposition products, and also those substances which due to the causes mentioned produce such products, so that a rubber is produced which can be used as a base for chewing gum without any objectionable qualities due to odor or taste, and which will retain the qualities desirable in a chewing gum base.

The invention is applicable to any form of rubber which is adapted for use as a chewing gum base, but I will by way of example describe it as being applied to the treatment of low grade rubbers commonly used in the manufacture of chewing gum.

It is well known that low grade rubbers adapted for use in chewing gum manufacture contain nitrogenous substances which in themselves are objectionable if retained in the rubber when made into gum, and which also, due to oxidation or bacterial action, produce decomposition products which are objectionable. One type of crude low grade rubber containing a small percentage of rubber and a relatively large percentage of resin and known as pontianak, not only contains these nitrogenous substances and decomposition products, but in addition contains quantities of kerosene which is present as a result of the treatment in preparing the coagulum from the latex. My invention not only will be found efficient for the removal of the decomposition products, and the substances resulting in such decomposition, but in the specific instance of pontianak will be found equally efficient in removing the kerosene. My invention also acts to efficiently remove volatile essential oils which are objectionable; it being well known that in chewing gum manufacture it is very desirable to employ a base which is not only odorless, but tasteless so as not to impair or destroy the flavor employed in the manufacture of the commercial gum, for example peppermint, wintergreen, etc.

I will now proceed to describe by way of example, one procedure of carrying my invention into effect.

I take a suitable crude rubber of any type which will serve as a base for chewing gum, and subject it to a preliminary treatment designed to remove or dissolve out of the rubber the nitrogenous substances present therein. By nitrogenous substances, I mean proteid substances, mucins and nitrogenous decomposition products. In order to accomplish this, the rubber, which may be in the crude form in which it comes in the market, is cut up or sliced into small pieces; the smaller the better, in order that all parts thereof will be sufficiently exposed to the subsequent treatment. This finely divided crude rubber is preferably placed in an open-work cage or receptacle and is immersed in a vessel containing a cold solution of about 5% strength caustic alkali preferably caustic soda or potassium hydroxid. This alkali solution may be made from the alkali carbonates, alkali bicarbonates or from calcium bi-carbonate but the caustic alkalis are preferred. The crude rubber is permitted to stand and soak in this solution for a period of time sufficient to dissolve out the nitrogenous substances and decomposition products which result I find by actual work will be accomplished in a period of from two to three days, the period depending on the fineness to which the rubber is cut up, and the accessibility of the solution to all parts of the rubber. The permeation and action of the alkali solution may be accelerated by subjecting the rubber to a rarefied atmosphere to remove air from the pores or interstices of the rubber, and then applying the alkali solution under pressure. I preferably employ the solution in the cold because it has been demonstrated that an application of heat results in the finely divided rubber being melted and run into a plastic mass resulting in the closing of the pores which prevents complete and efficient permeation of the alkali solution throughout the body of rubber being treated. The temperature of the alkali solution is that of room temperature but it will be understood that any temperature may be employed which does not operate to melt the material into such a plastic mass as to prevent thorough permeation of the alkali solution. This treatment with the alkali solution operates to dissolve out of the rubber those nitrogenous and other substances which are objectionable, and which due to bacterial action and oxidation result in decomposition products, and in addition decomposition products present.

After it has been assured that complete permeation of the alkali solution throughout the rubber mass has been effected, I may and preferably do subject the alkali solution to a boiling temperature so as to assure complete dissolution of the nitrogenous substances and decomposition products present. This boiling or heating step may be performed in the same vessel in which the rubber is subjected to the cold alkali, and is carried on long enough to insure complete dissolution. I have found that boiling or heating for a period of from one half to one hour will efficiently complete the dissolution. This boiling may be carried out in an open vessel, or in a closed vessel under pressure, the latter serving to hasten the action.

The open-work receptacle containing the rubber is then preferably removed from the alkali solution and the rubber is subjected to treatment designed to remove from the rubber mass the alkali solution and also the dissolution products produced by the alkali treatment. This may be accomplished by subjecting the rubber mass to a suitable eliminating or washing operation and may be carried out in any efficient rubber washing machine or apparatus commonly used in the art for the washing of rubber.

In crude rubbers other than pontianak it will be found that subsequent to the eliminating or washing operation, the rubber will still have some odor and taste, and in the case of pontianak will have odor and taste and also contain some kerosene with its peculiar odor and taste. This is due to the fact that the washing step does not, under commercial conditions, remove all traces of the odor and taste producing substances and kerosene. Some of these substances remain because the solution containing the substances is bound up in the rubber mass, and some of the substances are dissolved in the rubber mass.

I then subject the rubber to a treatment designed to remove from the mass all solutions, liquors and objectionable substances which are mixed with, or bound in the rubber mass. I accomplish this object by subjecting the mass to heat in the presence of an inert gas, preferably a current of inert gas, and preferably in a vacuum apparatus or chamber, so as to volatilize the objectionable substances and permit them to be eliminated, preferably by being drawn off by suction.

Figure 2:
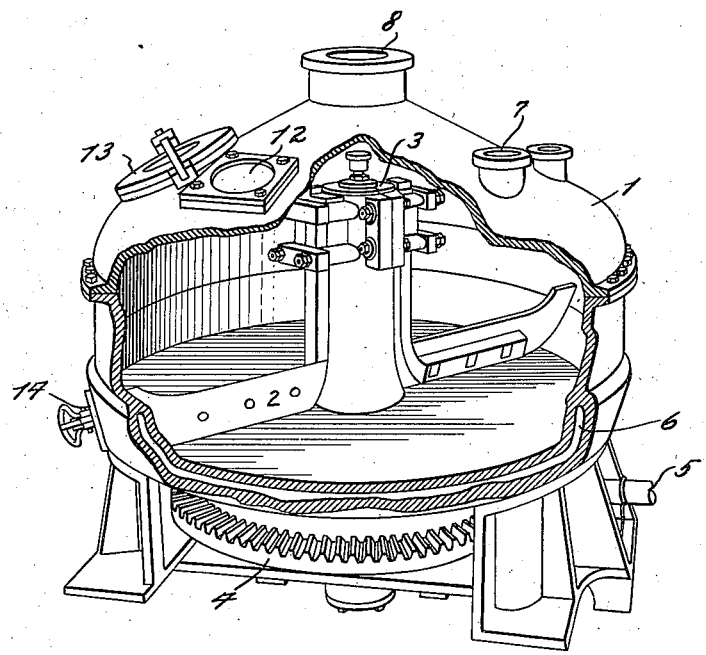

My invention is not limited in the performance of the step just described to any particular apparatus, although I prefer to employ one of a general type shown in the accompanying drawings, in which Fig. 1 is a side elevation of a preferred apparatus adapted to perform this step of the process, and Fig. 2 is a sectional view of the vessel in which the rubber mass is heated. In the preferred apparatus as shown in the drawings, 1 designates a shell or kettle provided with a rotary stirrer 2, or other suitable agitating means designed to agitate the mass, so that the heat may act on all parts of the mass in the presence of a current of inert gas, or preferably in a partial vacuum in the presence of an inert gas. The agitator or stirrer is mounted on a central shaft 3 driven by a bevelled gear 4 on the lower end of said shaft, which gear is in turn driven by a bevelled pinion mounted on a power shaft 5. I preferably heat the mass by external steam, and by steam, or an inert gas, injected into direct contact with the mass, the injected steam being preferably superheated, in which case it constitutes an inert gas. The external steam heating in the apparatus shown, may be performed by means of a steam jacket 6 surrounding the sides and base of the kettle, and the internal steam may be admitted through an inlet duct 7 in the top of the kettle. From the top of the kettle leads an outlet 8 connected by a conduit to a condenser 9 of any suitable type, which in turn is connected by a conduit 10 with a vacuum pump 11. The apparatus 1, may have a suitable opening 12 and closure 13, through which opening the mass is supplied to the apparatus 1, the latter also having an opening 14 by which the mass may be withdrawn.

The steam directed into contact with the mass may be passed over the surface of the mass, as shown in the drawings, or drawn or blown through the mass in any suitable manner, and in addition to heating performs a very important function of removing the objectionable substances from the rubber and the chamber or vessel in which the rubber is treated.

By performing the heating in the manner described in a rarefied atmosphere, I am able to employ a degree of heat necessary to volatilize the objectionable substances, but under conditions which will not serve to oxidize, or decompose, the rubber, that is, volatile substances are volatilized without danger of heating the rubber to such a point as to destroy its characteristics which make it desirable as a chewing gum base.

I have found by careful investigation, that any process involving continued heating in air cannot be carried out without deleterious effects in the rubber, and causing an increase in the resin contents of the rubber above that originally present therein. In other words, heating in the air at a temperature sufficient to volatilize the objectionable substances would result in oxidation and the consequent destruction of the rubber for use as a chewing gum base. The oxidation of the rubber or other destructive effects thereon due to heating in the air is efficiently prevented by conducting the heating of the rubber in the presence of an inert gas, and the destructive heat effects are prevented by conducting the heating operation in a rarefied atmosphere. By way of example, the temperature to which the rubber mass is heated in the rarefied atmosphere may be, for efficient results, from about 120° C. to about 150° C., under a vacuum of about 25 inches of mercury. Under higher vacuums the process can be carried out in a shorter length of time for a given temperature, while lower vacuums would take a longer time for the same temperature, and would require higher temperatures which I desire to avoid. The rubber mass when first placed in the vacuum heater contains a considerable quantity of water which is evaporated and carried off by preliminary heating in a vacuum or not, and which may be carried out without use of internal steam until the rubber mass is dried at which time the temperature of the mass will reach about 120° C. The internal steam, preferably superheated, or inert gas may then be admitted. The dried mass then begins to soften and the heating is continued for such a time as to insure all of the objectionable substances being volatilized and eliminated; about two hours' time will be found sufficient for this step of the process. Any form of vacuum heater provided with a suitable agitator may be used but I have found that most efficient results are obtained when a shallow vessel is employed permitting a large surface of the rubber mass to be constantly and repeatedly exposed to the vacuum and steam, such for example as shown in the drawings. In place of steam in contact with the rubber mass, I may employ any other suitable inert heated gas, for example hydrogen, carbon dioxide, nitrogen, etc., with the same result, steam however being preferred because of cheapness and simplicity of use. As a result of the heat treatment under vacuum it will be found that the rubber is tasteless and odorless and is ready to be employed as a base in the manufacture of chewing gum according to the well known processes which need not be described here.

If it is found that the gum contains foreign substances such as wood particles or sand it may be subjected to a filtering process for the purpose of eliminating these substances.

As the result of the above treatment, I produce a product having important characteristics which render it particularly adapted for use in chewing gum. For example, it is free from taste and odor, and in the case of pontianak is also free from kerosene which latter is a result not hitherto obtained. The product differs from many other if not all other crude rubber chewing gum materials of which I am aware, in that it is free from nitrogenous and other products causing objectionable deterioration and therefore does not deteriorate even after a long period of time. The product is much more ductile and is less resilient than the raw material but still retains the resiliency which is essential in a chewing gum base.

By describing the new product as being free from nitrogenous and other products causing objectionable deterioration, I mean that the new product is substantially free of such substances, that is, it may contain traces thereof but not to a substantial or objectionable extent.

What I claim as new and desire to secure by Letters Patent is:

1. A process for the treatment of crude rubber to produce a chewing gum base, which consists in dissolving nitrogenous substances therefrom, removing the resulting solution from the rubber, and removing volatile substances by subjecting the rubber to heat and the action of inert gas.

2. A process for the treatment of crude rubber to produce a chewing gum base, which consists in dissolving nitrogenous substances therefrom, and subjecting the rubber to heat and the action of a heated inert gas.

3. A process for the treatment of crude rubber to produce a chewing gum base, which consists in dissolving nitrogenous substances therefrom, and subjecting the same to heat, and the action of a current of a heated inert gas to remove moisture and volatile matter.

4. A process for the treatment of crude rubber to produce a chewing gum base, which consists in dissolving nitrogenous substances therefrom, removing moisture from the rubber, and then subjecting the rubber to heat and the action of an inert gas.

5. A process for the treatment of crude rubber to produce a chewing gum base, which consists in subjecting the rubber in a finely divided state to a solvent for nitrogenous substances, washing the rubber to free it from the solution containing said substances, removing moisture from the rubber, and then subjecting the rubber to heat and the action of an inert gas.

6. A process for the treatment of crude rubber to produce a chewing gum base, which consists in subjecting the rubber in a finely divided state to a solvent for nitrogenous substances, washing the rubber to free it from the solution containing said substances, removing moisture from the rubber, and then subjecting the rubber to heat and the action of an inert gas accompanied by agitation.

7. A process for the treatment of crude rubber to produce a chewing gum base, which consists in subjecting the same to a solvent for nitrogenous substances, and under conditions permitting thorough permeation of the solvent throughout the rubber mass, and then subjecting the rubber to heat conditions removing moisture and volatile substances therefrom, and the action of an inert gas.

8. A process for the treatment of crude rubber to produce a chewing gum base, which consists in dissolving nitrogenous substances therefrom, and subjecting the same to heat in the presence of a current of a heated inert gas and in a rarefied atmosphere.

9. A process for the treatment of rubber to produce a chewing gum base, which consists in dissolving nitrogenous substances out of the rubber, and subjecting the rubber to heat in a rarefied atmosphere in the presence of an inert gas.

10. A process for the treatment of rubber to produce a chewing gum base which consists in dissolving nitrogenous substances therefrom by a suitable solvent, washing the rubber and subjecting the washed rubber to heat in a rarefied atmosphere in the presence of an inert gas.

11. A process for the treatment of rubber to produce a chewing gum base which consists in subjecting the same in a finely divided condition to a solvent for nitrogenous substances, washing the solution from the rubber, and subjecting the washed rubber mass to heat in a rarefied atmosphere in the presence of an inert gas.

12. A process for the treatment of rubber to produce a chewing gum base which consists in subjecting the same to a solvent for nitrogenous substances, separating the solution containing said substances from the rubber, and subjecting the rubber to heat in a rarefied atmosphere in the presence of an inert gas under conditions exposing large areas of the mass to said atmosphere and gas.

13. A process for the treatment of rubber to produce a chewing gum base which consisting in subjecting the rubber in a finely dividend condition to a solvent for nitrogenous substances, washing the rubber to free it from the solution containing said substances, and then subjecting it to heat in a rarefied atmosphere in the presence of an inert gas under conditions exposing large areas of the rubber to the inert gas.

14. A process for the treatment of rubber to produce a chewing gum base consisting in subjecting the rubber in a finely divided condition to an alkali solution to dissolve nitrogenous and decomposition products therefrom, washing the solution containing said substances from the rubber and heating the washed rubber in a rarefied atmosphere in the presence of a neutral gas during agitation of the rubber.

15. A process for the treatment of crude rubber to produce a chewing gum base which consists in subjecting the same in a finely divided condition to a cold solution of a solvent for nitrogenous substances for a period of two to three days, separating the solvent from the rubber, and then heating the rubber in a rarefied atmosphere.

16. A process for the treatment of crude rubber to produce a chewing gum base which consists in subjecting the same in a finely divided condition to a cold solution of a solvent for nitrogenous substances for a period of two to three days, separating the solvent from the rubber, and then heating the rubber in a rarefied atmosphere in the presence of a neutral gas.

17. A process for the treatment of rubber to produce a chewing gum base which consists in subjecting the same in a finely divided condition to a cold solution of a solvent for nitrogenous substances for a period of two to three days, separating the solution from the rubber, and then heating the rubber in a rarefied atmosphere at a temperature of from about 120° C. to about 150° C. for a period of from approximately one to two hours.

18. A process for the treatment of crude rubber to produce a chewing gum base, which consists in dissolving nitrogenous substances therefrom by a suitable solvent, washing the rubber to remove the solvent and nitrogenous substances carried thereby, and then subjecting the washed rubber to heat in a rarefied atmosphere under conditions exposing large areas of the mass to said atmosphere.

19. A process for the treatment of crude rubber to produce a chewing gum base, which consists in subjecting the same to a solvent for nitrogenous substances and under conditions permitting thorough permeation of the solvent throughout the rubber mass, heating the rubber and solvent while in contact, removing the solvent and the matter contained therein from the rubber, subjecting the rubber to the action of heat and a heated inert gas.

20. A process for the treatment of crude rubber to produce a chewing gum base, which consists in subjecting the same to a cold solvent for nitrogenous substances and under conditions permitting thorough permeation of the solvent throughout the rubber mass, boiling the solvent while in contact with the rubber, removing the solvent with the contained matter in solution therein from the rubber, and then subjecting the rubber in a rarefied atmosphere to heat and the action of an inert gas.

21. A process for the treatment of crude rubber to produce a chewing gum base which consists in dissolving nitrogenous substances therefrom, removing the resulting solution from the rubber, and removing volatile substances by subjecting the rubber to the action of a heated inert gas.

22. A process for the treatment of crude rubber to produce a chewing gum base which consists in dissolving nitrogenous substances therefrom, removing the resulting solution from the rubber, and removing volatile substances by subjecting the rubber to the action of superheated steam.

23. A process for the treatment of crude rubber to produce a chewing gum base which consists in dissolving nitrogenous substances therefrom, removing the resulting solution from the rubber, and removing volatile substances by subjecting the rubber to the action of superheated steam having a temperature sufficient to heat the rubber to approximately 120° C. to 150° C.

24. A process for the treatment of crude rubber to produce a chewing gum base which consists in dissolving nitrogenous substances therefrom, removing the resulting solution from the rubber, and removing volatile substances by subjecting the rubber to the action of superheated steam having a temperature sufficient to heat the rubber to approximately 120° C. to 150° C., said heating being accompanied by agitation.

25. A process for the treatment of crude rubber to produce a chewing gum base which consists in dissolving nitrogenous substances therefrom, removing the resulting solution from the rubber, and removing volatile substances by subjecting the rubber in a closed receptacle and in absence of air to the action of a current of heated inert gas passed through said receptacle and in contact with the rubber.

26. A process for the treatment of crude rubber to produce a chewing gum base which consists in dissolving nitrogenous substances therefrom, removing the resulting solution from the rubber, and removing volatile substances by subjecting the rubber to heat and the action of an inert gas under conditions precluding contact of air with the rubber.

27. A process for the treatment of crude rubber to produce a chewing gum base which consists in subjecting the same to a solvent for nitrogenous substances and under conditions to permit thorough permeation of the solvent throughout the rubber mass, heating the solvent while in contact with the rubber, removing the solvent with the contained matter in solution therein from the rubber, and then subjecting the rubber to heat and the action of an inert gas under conditions inhibiting contact of air with the rubber.

28. A process for the treatment of crude rubber to produce a chewing gum base which consists in subjecting the same to a solvent for nitrogenous substances and under conditions to permit thorough permeation of the solvent throughout the rubber mass, heating the solvent while in contact with the rubber, removing the solvent with the contained matter in solution therein from the rubber, and then subjecting the rubber to heat and the action of an inert gas under conditions inhibiting contact of air with the rubber and accompanied by agitation.

29. A process for the treatment of crude rubber to produce a chewing gum base which consists in dissolving nitrogenous substances therefrom, removing the resulting solution from the rubber, and removing volatile substances by subjecting the rubber to the action of a heated inert gas under conditions precluding contact of air with the rubber.

30. A process for the treatment of crude rubber to produce a chewing gum base which consists in subjecting the same for a period of approximately two days or longer to a solvent for nitrogenous substances and under conditions to permit thorough permeation of the solvent throughout the rubber mass, heating the solvent while in contact with the rubber, removing the solvent with the contained matter in solution therein from the rubber, and then subjecting the rubber to heat and the action of an inert gas under conditions inhibiting contact of air with the rubber.

In testimony whereof I have hereunto signed my name in the presence of two subscribing witnesses.

WALLACE APPLETON BEATTY.

Witnesses:
ADELE S. EBERHARDT,
C. G. HEYLMUN.